May 4, 1943.                F. H. COLLINS                2,318,141
                      APPARATUS FOR PRESERVING JUICE
                         Filed March 3, 1941
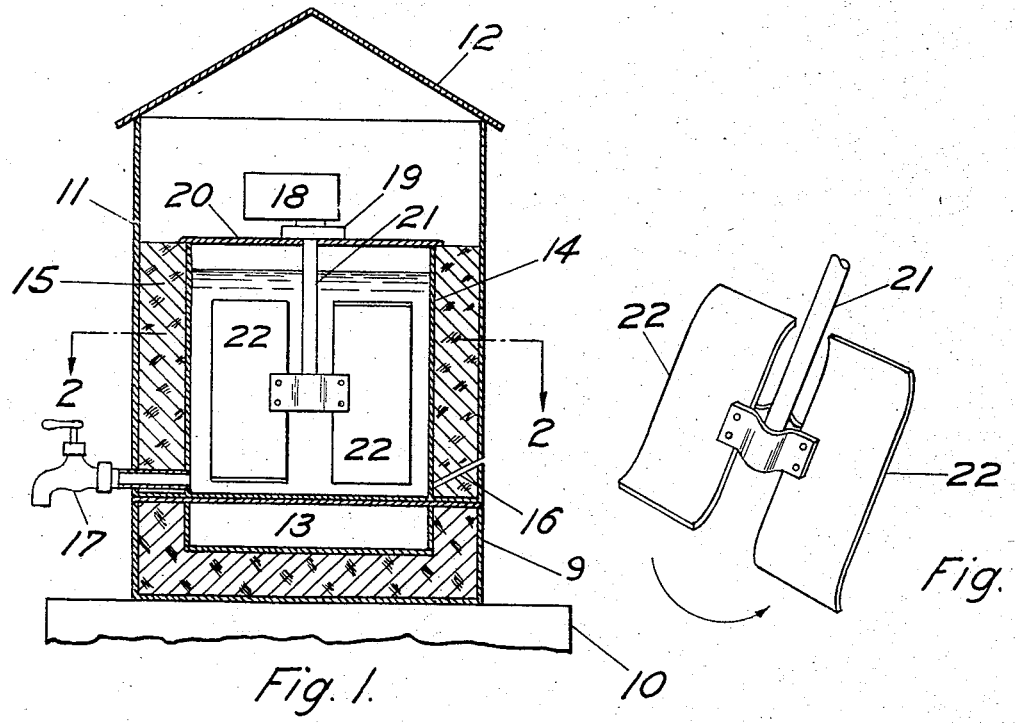
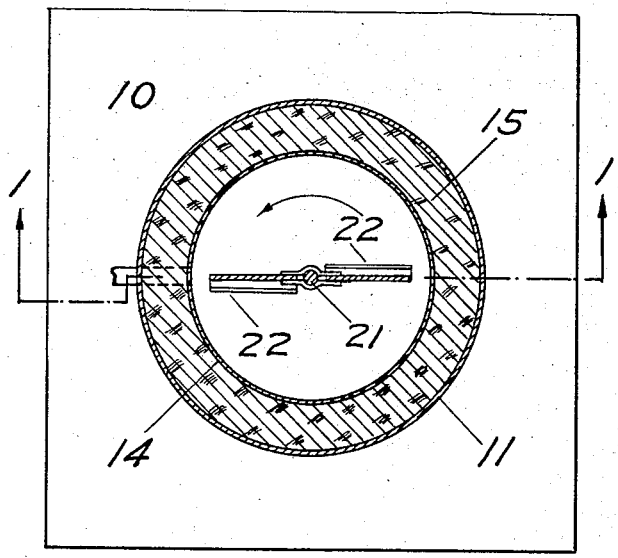
INVENTOR
Frank H. Collins
per Robert E. Harris
Attorney Patented May 4, 1943

2,318,141

UNITED STATES PATENT OFFICE 2,318,141

APPARATUS FOR PRESERVING JUICE

Frank H. Collins, Orange, Calif., assignor to California Fruit Growers Exchange, Los Angeles, Calif., a corporation of California Application March 3, 1941, Serial No. 381,447

5 Claims. (Cl. 99—239)

This invention relates to means for storing and preserving fruit juices. More particularly, the invention relates to means for maintaining fruit juices in substantially fresh condition.

Ordinarily fruit juices, and particularly citrus fruit juices, undergo various changes soon after their preparation. These changes occur more rapidly in some types of juice than in others, but in all cases where the changes do occur, they adversely affect the quality and taste of the juice from the standpoint of the consumer. Many factors contribute to this change in the juice, as, for example, those due to ferments, oxidation by air and light, as well as the temperature when considered with these factors.

A great deal of work has been done in an effort to minimize, if not eliminate, the effects of the various factors mentioned above. For example, fermentation, or bacterial changes are controlled by the addition of preservative, or by subjecting the juice to pasteurizing temperatures for sufficient lengths of time, or both. Unfortunately, although the change in the juice due to fermentation may be eliminated, the addition of a preservative often adversely affects the flavor of the juice, and subjecting the juice to pasteurizing temperatures often may impart to the product a taste commonly spoken of as a "cooked" taste. Similarly, a great deal of attention has been directed to ways and means of minimizing or eliminating the effects caused by oxidation. For example, it has been suggested that the separation of the juice from its natural place in the fruit should take place in the presence of an inert gas to the entire exclusion of air, particularly oxygen, and that air within the juice product should be displaced by means of an inert gas.

Now, it is true that the changes which a fruit juice undergoes after preparation have been studied, and many methods have been proposed for minimizing the changes, but in all cases, the processes ultimately selected, or even suggested, are complex and involve steps which greatly increase the cost of preparation of the product, and correspondingly increase the cost to the consumer. Moreover, many such processes are of such a nature that much difficulty is encountered in attempting to have them put into practice by any except the most highly skilled workmen.

I have found that the above mentioned adverse changes in the juice can be effectively overcome by methods hereinafter disclosed. In general, my invention comprises maintaining a body of freshly prepared juice at a temperature sufficiently low to prevent fermentative and bacterial action, and to reduce oxidative effects. At the same time, I maintain the body of juice in constant non-turbulent motion and simultaneously sweep the air from the body of the juice. This may advantageously be accomplished by means of a device adapted to the performance of the process. Such means are illustrated herein.

Accordingly, an object of this invention is to provide and disclose methods and means for maintaining fruit juices in substantially fresh condition for a considerable period after their preparation.

A further object of this invention is to provide both methods and means for maintaining a fruit juice in condition such that adverse changes in the juice are substantially minimized.

A still further object of this invention is to provide and disclose means suitably adapted, among other uses, to the carrying out of the process of my invention.

These and other objects, uses, and advantages of my invention will become apparent to those skilled in the art as the description proceeds in connection with the accompanying drawing in which:

Fig. 1 is a vertical section of the device taken along the line 1—1 of Fig. 2.

Fig. 2 is a horizontal section of the device taken along the line 2—2 of Fig. 1, and showing the cabinet broken away.

Fig. 3 is a perspective view of the impeller.

Corresponding and like parts are referred to in the following description and are indicated in all views of the drawing by the same reference numbers.

Referring now to the drawing in detail, it will be apparent that the embodiment of the invention which has been illustrated comprises a refrigerating cabinet 10, shown mostly broken away. Within the cabinet 10 is contained a suitable refrigeration mechanism, not shown. The cabinet 10 has, as an integral part thereof, a raised portion 9 on top within which is housed a cold plate 13 which may be refrigerated, for example, by means of gas expansion operating in conjunction with the refrigeration mechanism in the usual manner. The cold plate is surrounded on sides and bottom by suitable insulating material within the raised portion 9. Supported by the raised portion 9 of the cabinet containing the cold plate 13, is removably positioned a container 11, having a hood 12. Said container is so positioned on the cabinet that the cold plate 13 is in immediate contact with the bottom of the container 11. Within the container 11, there is a juice compartment 14 completely separated from the sides of the container 11 by the insulation 15. The bottom of the juice compartment 14 is formed from a portion of the bottom of the juice container 11. Through the side of the container 11 and the insulation 15 is a thermostat well 16 adapted to permit the placing of a thermostat unit in contact with the wall of the juice compartment 14. A spigot 17 is connected to the juice compartment 14 to permit the withdrawal of the juice. A motor 18 operating, if desired, in conjunction with a gear reduction device 19 is positioned on the juice compartment cover 20. Within the juice compartment 14 there is centrally positioned an impelling device comprising a shaft 21 connected to the gear reduction mechanism 19, said shaft carrying vanes 22. In particular, it is desired to point out at this time that the vanes 22 are shaped in such a manner and are rotated in such a direction that there will be a gentle but positive movement of the juice from the bottom of the juice compartment towards the top of the compartment. The advantages to be obtained by constructing the impelling mechanism in such a manner will be discussed in more detail hereinafter. Fig. 3, which is a perspective view of the impeller, clearly shows the slight S-shape of the vanes and their arrangement on the shaft 21 so that the above-mentioned effect will be obtained.

The device illustrated in the drawing may be made in accordance with the following description. However, it is to be understood that many modifications in the type and kind of materials used in the construction may be made without departing from the general principles set forth. For example, I choose to construct the juice compartment in a cylindrical shape, since I believe this shape is advantageous in that it permits me to effect a non-turbulent movement of the juice within the compartment much more readily than a compartment of some other shape. In addition, the relative proportions and relationships of the various parts may be varied within comparatively wide limits. Accordingly, when specific dimensions are referred to, it is merely for the purpose of disclosing to those skilled in the art a satisfactory size. Such dimensions are to be taken as in no wise critical, but the general relationships which they illustrate are important. I have found that a very satisfactory device may be made in accordance with the following dimensions.

The rectangular refrigerating cabinet 10 may be of such size as to satisfactorily house the necessary refrigerating unit. A cabinet about thirty-two inches square and thirty inches high will adequately house one such available refrigerating mechanism. The raised portion 9 of the cabinet which houses the cold plate may advantageously be made the same shape as the container 11 which rests thereon in order to insure adequate support for the container and to enhance the symmetry of the device. Since I choose to have the container 11 of cylindrical shape and about twenty inches in diameter, I find it convenient to have the raised portion 9 housing the cold plate also cylindrical in shape and of the same diameter. Similarly, with respect to the cold plate 13, I find it convenient to have it, in general, correspond to the size of the juice compartment 14. That is to say, if the cylindrical juice compartment has a diameter of fourteen inches, then I may preferably use a cylindrical cold plate having a diameter of fourteen inches. Such a correlation assures that the bottom of the juice compartment will be evenly cooled since it will be in contact with the surface of a cold plate of at least the same extent. I have found that about three inches of good insulation between the juice compartment 14 and the container 11 is adequate to permit effective cooling of the contents of the juice compartment. Also, I insulate the cold plate 13 along its bottom side by a three inch layer of insulation material.

With respect to the motor and gear reduction means, I have found it convenient to use a small electric motor of about one-fortieth horse power having a speed of about 1600 R. P. M. The speed of the motor is then reduced by the gear reduction device to about 25 R. P. M. Obviously, other arrangements could be made to motivate the impeller, though I believe that it is important that a comparatively slow but continuous rotation of the impelling device be obtained.

In particular, the impeller which I have found to be satisfactory in devices of the size above described is one in which the vanes 22 are each about ten inches in length and five inches wide. These vanes are, as mentioned before, slightly S-shaped. The extreme upper and lower ends of the vanes deviate about an inch from the vertical plane of the main portion of the vanes. The vanes are so arranged on the impeller shaft 21 and related to the direction of rotation of the impeller that they tend to lift the juice very gently from the bottom of the compartment towards the top, thereby assuring uniform cooling of the body of juice, as well as thorough, non-turbulent mixing of the juice. It is to be noted that the vanes "sweep" through most of the space within the juice compartment so that the whole body of juice is put and kept in uniform, as well as non-turbulent, motion. Furthermore, there is a positive tendency to sweep the air to the surface and out of the body of juice thereby reducing oxidation of the juice.

The spigot used to withdraw the contents from the juice compartment may be of any satisfactory design.

I find it advantageous to have a thermostat unit in contact with the lower portion of the juice compartment, the thermostat automatically operating in conjunction with the refrigerating mechanism so as to maintain the temperature of the contents of the juice compartment within a predetermined temperature range.

Although the materials with which my device can be made are variable within wide limits, I choose to have all parts which come in contact with the juice to be of a non-corrosive nature. In particular, I have found that stainless steel is very satisfactory, although glass or other highly non-corrosive materials may be used from which to construct the various parts coming in contact with the juice.

In the operation of my device, I fill the juice container with the fresh juice which may or may not be chilled to within a temperature range of about 32° to 34° F. The impeller is put in operation, as is also the refrigerating mechanism. As soon as the contents of the juice compartment have reached a temperature range of from between 32° to 34° F., the thermostat automatically operates to shut off the refrigeration mechanism. When the temperature of the contents tends to rise above about 34° F., the refrigerating mechanism automatically starts and the content of the juice compartment is chilled to within the predetermined temperature range. I choose to have the impeller in operation at all times that the device is in use. The juice may be withdrawn by means of the spigot 17 and additional juice may be added to the container as the need arises by merely removing the hood 12 from the container and the cover of the juice compartment and pouring in more juice.

Without attempting to enter upon any highly detailed theoretical explanation of the ultimate phenomena behind the results which I thus obtain, I desire to point out emphatically that fresh juice, for example, fresh orange juice, handled by the method outlined can be kept for days in a condition such that experienced tasters of good sensitivity can scarcely differentiate it from freshly extracted juice. My experience with the method leads me to the conclusion that temperatures approximating the range indicated and slow but continuous, uniform, and non-turbulent movement of the whole body of the juice cooperate to produce the most highly desirable results.

I claim:

1. A juice preserving apparatus comprising an insulated juice container, refrigerating means associated with said juice container but out of contact with the contents thereof, means comprising a rotatable impeller having S-shaped vanes attached thereto, said impeller being positioned within said juice container and being adapted to effect a non-turbulent movement of the body of juice to effect deaeration of said juice and to maintain the homogeneity thereof.

2. In a juice preserving apparatus comprising an insulated juice container, refrigerating means associated with said juice container but out of contact with the contents thereof, and a rotatable impeller within said juice container, said impeller having attached thereto S-shaped vanes so proportioned with respect to the juice container as to sweep a relatively major portion of the space within the container, said impeller adapted to effect a non-turbulent movement of the body of juice to effect deaeration and to maintain the homogeneity thereof.

3. In a juice preserving apparatus comprising an insulated juice container, refrigerating means associated with said juice container but out of contact with the contents thereof, said refrigerating means being automatically operated to maintain the contents of the juice container within a temperature range of from about 32° F. to about 34° F., means comprising a rotatable impeller having S-shaped vanes attached thereto, said impeller being positioned within said juice container and being adapted to effect a non-turbulent movement of the body of juice to effect deaeration of said juice and to maintain the homogeneity thereof, and means for removing juice from said container.

4. In a juice preserving apparatus comprising an insulated juice container, refrigerating means associated with said juice container for cooling the contents thereof and a rotatable impeller within said juice container, said impeller having attached thereto S-shaped vanes so proportioned with respect to the juice container as to sweep a relatively major portion of the space within the container, said impeller adapted to effect a non-turbulent movement of the body of juice to effect deaeration and to maintain the homogeneity thereof.

5. A juice preserving apparatus comprising an insulated juice container, refrigerating means associated with said juice container for cooling the contents thereof, means comprising a rotatable impeller having S-shaped vanes atached thereto, said impeller being positioned within said juice container and being adapted to effect a non-turbulent movement of the body of juice to effect deaeration of said juice and to maintain the homogeneity thereof.

FRANK H. COLLINS.